Dec. 24, 1946.  A. A. WOLFF  2,413,204
COOKING UTENSIL
Filed Nov. 2, 1944

Alexander A. Wolff
INVENTOR

BY Frank T. Wentworth
his ATTORNEY.

Patented Dec. 24, 1946

2,413,204

UNITED STATES PATENT OFFICE 2,413,204

COOKING UTENSIL

Alexander A. Wolff, Long Beach, N. Y.

Application November 2, 1944, Serial No. 561,540

3 Claims. (Cl. 99—447)

The invention relates to cooking utensils and more particularly to an article of this kind for use upon the top of a gas range or hot plate for cooking various foods in various styles.

In a cooking utensil for use upon the top of a gas range where it is subjected directly to the flame of the burner, there is not only great difficulty in securing an effective distribution of the heat but in ensuring its effective utilization in uniformly applying it to the food being cooked. I have found it impracticable to have the food contact with the portion of utensil which is subjected directly to the gas flame because this not only has a tendency to apply excessive heat to the part of the food in contact with the utensil so as to overcook this part of the food but to actually burn the food in contact with the utensil before other parts thereof have been properly cooked and in some instances even warmed through. The burning of the surface of some foods, such as meats, not only impairs the taste of the cooked food but causes it to adhere to the cooking utensil so as to make proper turning or removal of the food impossible. With the use of an ordinary skillet, fats of some kind are resorted to to prevent burning and facilitate turning or removal of the food during the preparation of a meal, but such fats may burn and adhere to the skillet in addition to causing smoke and objectionable cooking odors in a room.

The fouling of a cooking utensil from the above causes, all resulting from an improper distribution and application of heat, necessitates a thorough cleansing and scouring of a utensil after each use, to avoid unsanitary conditions.

In a cooking utensil embodying the invention, the portion which is subjected directly to the flame from a gas burner is rapidly brought to a red heat, although about this area, the metal is at a considerably lower temperature. Because of this condition, I so construct the utensil as to permit the use, in this part, of a metal having a low carbon content, and associate therewith what may be termed a grill plate upon which the food is placed, this plate being spaced from the bottom or heat absorbing and distributing base so as to prevent concentration of heat upon any part of the grill plate and effectively distribute the direct and the radiant heat passing through openings in the base from the gas burner, or from the incandescent portion of said base, and possibly being conducted to the grill plate through the means supporting it from the base. Said grill plate merely rests upon the base so that it is not only separable therefrom so as to be readily cleaned with the minimum of effort, but may be made of material without regard to the action of gases at a high temperature thereon, and which may be highly polished or even plated, to preclude adherence of food thereto.

The grill plate is not only imperforate so as to preclude drippings from food thereon falling upon the heated base, with a resultant development of smoke and cooking odors, but has a trough formed about its edge so as to preserve any meat juices that they may be used in making a dressing for the cooked food.

To facilitate handling of the utensil while it is in use, I provide the base with a projecting handle which for convenience in shipping and storage, is pivoted to and foldable upon the base in the space between it and the grill plate.

The various parts are constructed and combined so as to permit the use of a removable hood which completely envelops the various parts excepting the bottom of the base and the handle while the utensil is in use, thus confining all heat in the utensil and directing it upwardly and about the grill plate.

The invention consists primarily in a cooking utensil embodying therein a base having an upwardly directed edge flange and an upwardly dished or domed central portion provided with a plurality of perforations therethrough, an imperforate grill plate removably supported from and in spaced relation to, and of smaller dimensions than, said base, and an imperforate hood removably supported from said base, the lower part of said hood having substantially the same dimensions as said base but greater dimensions than said grill plate, whereby a passage for heated gases is afforded about the edge of said grill plate; and in such other novel features of construction and combination of parts as are hereinafter set forth and described and more particularly pointed out in the claims hereto appended.

Referring to the drawing.

Like numerals refer to like parts throughout the several views.

Figure 1:
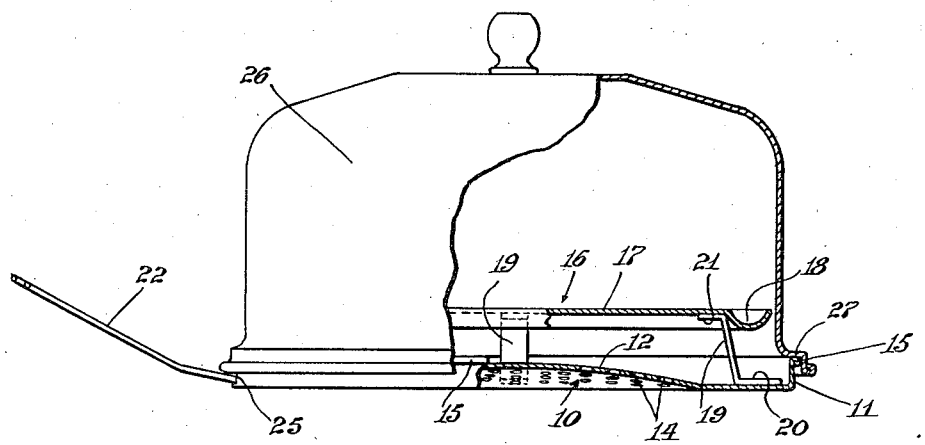
Fig. 1 is an elevation of a cooking utensil embodying the invention, partly broken away.
Figure 2:
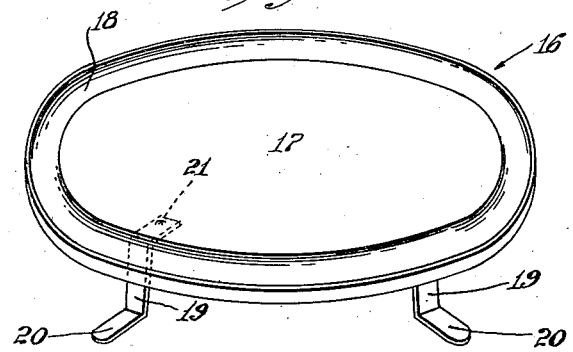
Fig. 2 is a perspective view of the grill plate.

In the embodiment of the invention shown in the drawing, the utensil consists of a circular base 10 having an upwardly directed edge flange 11 and an upwardly slightly dished or domed central portion 12 spaced from the flange 11 by a flat circular seat 13 for supporting a grill plate in a manner hereinafter described. The base 10 centrally of the portion 12 is imperforate but about this imperforate area are a plurality of openings 14 which permit the passage of flame and hot gases and accelerate the bringing of the base immediately above the burner of a gas range or hot plate to incandescence. In this manner the hot gases from the burner are somewhat concentrated below the central imperforate portion of the base and distributed in part by deflection by the bottom of the base; in part by the lateral trend of gases passing through the openings in the base; in part by the radiance of the base, and in part by the grill plate. By bringing the base to incandescence, a more uniform application of heat throughout the grill plate is secured and the heat from the gas burner is more effectively utilized.

The manner of controlling and utilizing the heat from the gas burner, in part by the direct application to the grill plate of heated gases flowing through the openings 14 in the base, and in part by radiant heat from the central raised portion 12 of the base, avoids the presence of hot spots in the grill and a more even temperature throughout the utensil. It also permits excess hot secondary air to circulate about the base 10 and through the openings 14, avoiding sooting of the base, which would reduce its heat conductivity.

The base 10 is made of material which will not burn out from the intense heat of a gas flame, preferably sheet steel having a low carbon content.

To assist in preventing warping of the base 10, I stiffen the edge flange 11 by a curled bead 15 about its top.

Resting upon and separable from, the base 10 is a grill plate 16 of smaller diameter than the base, so as to permit hot gases impinging thereupon and laterally deflected thereby, to pass to above said plate. The top of this grill plate is imperforate, as shown at 17, and its edge is troughed downwardly as at 18 to accumulate any meat juices or other fluids for culinary purposes as well as to prevent their dripping upon the hot base 10, where they would char and produce smoke and cooking odors.

The grill plate is provided with a plurality of legs 19 each having an outturned foot 20 adapted to rest upon the plane edge portion or circular seat 13 of the base 10 and by engagement with the edge flange 11 center the grill plate 16 in relation to the base and hold it against slippage while the utensil is in use. Each leg 19 also has a top angle 21 by means of which it may be secured, by spot welding or riveting to the grill plate.

The legs 19 are of a length to space the grill plate 16 from the base 10 sufficiently to afford ample space for the flow of heated gases between the grill plate and the base and avoid overheating of any part of the plate or spot heating thereof.

Since the grill plate is not subjected to the same high temperature as the base, it may be made of a metal, such as cold rolled steel, which will take and hold a high polish and even may be plated.

Figure 3:
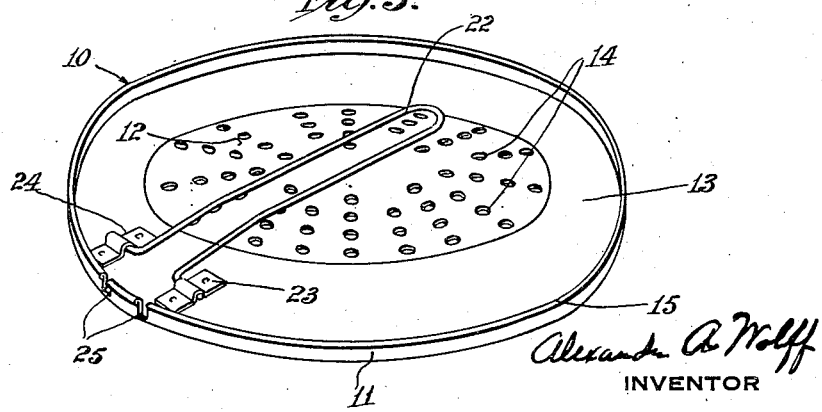
Fig. 3 is a perspective view of the base with the handle folded upon it.

To facilitate the handling of the utensil while in use, I provide the base plate 10 with a looped wire handle 22 and in order to make more convenient the packing, shipment and storage of the utensil, I pivot this handle upon the seat 13 of the base so that it can be folded upon and against said base in the space between it and the grill plate. This is done by means of outturned ends 23 on the handle pivoted in sockets 24 secured by spot welding or riveting to the base. The edge flange 11 of the base is notched as at 25 to permit the handle 22 to pass this flange and assume an angular relation to the base as in Fig. 1 convenient for the handling of the utensil. When the handle is in the position of Fig. 3, the ends 23 may be drawn together so as to disengage them from the sockets 24, but when the handle is folded outwardly the arms of the handle are held in the notches 25 which prevent accidental detachment. The straps 24 being positioned remote from the flange 11 at the edge, when the handle is in extended position as shown in Fig. 1, it bears against the bottom of the notches 25 which enables the device to be lifted up by the handle. The weight of the device is delivered at approximately the center of the base 10 and taken by the sockets 24 while the fulcrum of the lever is at the bottom of the notches in the rim of the base. Since the seat 13 does not reach a high temperature comparable with the dished or domed central portion 12, overheating of the handle to an extent to burn the hand of the user of the utensil does not occur to an extent greater than with an ordinary skillet.

To direct the flow of the hot gases upwardly and about the edge of the grill plate 16, I provide a removable hood 26 having an outwardly directed shoulder 27 above the bottom edge of the hood which is adapted to rest upon the top of the flange 11 of the base 10 by which it is centered in relation to the grill plate leaving a uniform gap between the edge of the grill plate and the surrounding hood. This assists in securing a uniform distribution of the heated gases flowing from between the base and the grill plate upwardly to above the latter.

When the utensil is to be used, the handle 22 is turned outwardly and the grill plate 16 is positioned on the base 10 with the several feet 20 resting upon the seat 13 with the ends of the feet engaging the edge flange 11. The utensil is then placed above the lighted gas burner.

The portion 12 of the base 10 rapidly becomes incandescent from the burner flame and heat and flame from the burner passing directly through the various openings 14, and the heat and flame passing through such openings and radiant heat from the incandescent portion of the base is directed upwardly and outwardly by reason of the upwardly dished or domed portion 12 of the base as well as the outwardly directed axes of the openings 14. In this manner concentration of heat upon any spot or portion of the grill plate is avoided.

When food such as meat to be grilled, potatoes to be baked, etc. is placed upon the grill plate, the hood 26 is placed over the grill plate with its shoulder 27 resting upon the top of the edge flange 11 of the base 10, which automatically positions the hood to form the gap of uniform width completely about the grill plate. The hood thus serves to direct the gases flowing radially of and below the grill plate in substantially uniform volume to all parts of the hood above the grill plate.

The grill plate never becomes sufficiently hot to cause it to become incandescent and heat losses are so low, from radiation, that practically all of the heat from the gas burner is utilized.

The hood confines any smoke or other fumes resulting in cooking odors, which by control of the temperature of the grill plate are reduced to a minimum, and the edge trough 18 prevents fluids from the food from dripping upon the base, the much higher temperature of which would produce excessive smoke and fumes and cause it to become so fouled as to make cleaning difficult.

The three parts of the utensil being separable, one from the other, washing and scouring of these parts is made easy.

It is not my intention to limit the invention to the use of particular materials, and to the other details of construction as shown in the drawing, it being obvious that such may be varied without departing from the spirit and scope of the invention.

Having described the invention, what I claim as new and desire to have protected by Letters Patent is:

1. A cooking utensil embodying therein a base having an upwardly directed edge flange and an upwardly dished or domed central portion provided with a plurality of perforations therethrough, a looped handle pivotally connected at one end to and foldable upon said base remote from said flange, said flange being notched to permit said handle to be turned to bring it outside of said base, an imperforate grill plate removably supported from and in spaced relation to, and of smaller dimensions than, said base, and an imperforate hood removably supported from said base, the lower part of said hood having substantially the same dimensions as said base but greater dimensions than said grill plate, whereby a passage for heated gases is afforded about the edge of said grill plate, said base, plate and hood being arranged in nested relationship whereby said handle is adapted to lift all of said parts.

2. In a cooking utensil, a circular base having an upwardly extending edge flange, an upwardly extending perforated domed central portion and an annular flat portion between said domed portion and said flange for supporting a grill plate and a handle member hinged at one end to said flat portion remote from said flange and adapted to be folded flatwise across said flat and domed portions within said flange, said flange being provided with a cut-out for receiving said handle to permit it to be turned to bring it to operative extended position outside of the base for lifting the base.

3. A cooking utensil comprising a circular base having an upwardly extending edge flange with a cut-out, an upwardly extending perforated domed central portion and a substantially flat circular portion between said domed portion and flange, a grill plate supported on the flat portion of said base in spaced relation thereto, a handle member hinged at one end to the upper surface of said flat portion remote from said flange and a removable hood covering said base and grill plate, said handle member being adapted to be folded flatwise across said flat and domed portions in the space between the base and grill plate for shipping purposes and adapted when in operative position to be received in said cut-out and to extend outside of said base for lifting and transporting the base, grill plate and hood.

ALEXANDER A. WOLFF.